United States Patent
Todaka et al.

(10) Patent No.: US 10,377,924 B2
(45) Date of Patent: Aug. 13, 2019

(54) ADHESIVE TAPE FOR FASTENING

(71) Applicant: TERAOKA SEISAKUSHO CO., LTD., Tokyo (JP)

(72) Inventors: Katsunori Todaka, Tokyo (JP); Hitomi Oosaki, Tokyo (JP); Kazuhiko Tanbo, Tokyo (JP)

(73) Assignee: Teraoka Seisakusho Co., Ltd., Tokyo (JP)

( * ) Notice: Subject to any disclaimer, the term of this patent is extended or adjusted under 35 U.S.C. 154(b) by 188 days.

(21) Appl. No.: 15/300,244

(22) PCT Filed: Mar. 31, 2014

(86) PCT No.: PCT/JP2014/059522
§ 371 (c)(1),
(2) Date: Sep. 28, 2016

(87) PCT Pub. No.: WO2015/151188
PCT Pub. Date: Oct. 8, 2015

(65) Prior Publication Data
US 2017/0174949 A1 Jun. 22, 2017

(51) Int. Cl.
*C09J 7/21* (2018.01)
*C09J 133/00* (2006.01)
(Continued)

(52) U.S. Cl.
CPC ............ *C09J 7/21* (2018.01); *C08G 18/6216* (2013.01); *C08G 18/8029* (2013.01); *C09J 7/25* (2018.01);
(Continued)

(58) Field of Classification Search
CPC . C09J 2477/006; C09J 7/21; C09J 7/04; C09J 7/045; C09J 2433/00; C09J 11/00; D03D 1/02; D10B 2505/124
See application file for complete search history.

(56) References Cited

U.S. PATENT DOCUMENTS

| | | | |
|---|---|---|---|
| 6,182,709 B1 * | 2/2001 | Konishi | ............... B60R 21/235 139/1 R |
| 6,601,614 B1 * | 8/2003 | Ishii | ..................... B60R 21/235 139/389 |
| 2010/0282358 A1 * | 11/2010 | Kano | ................... B60R 21/235 139/384 R |

FOREIGN PATENT DOCUMENTS

| | | |
|---|---|---|
| CN | 101883891 B | 9/2012 |
| EP | 1225262 A1 | 7/2002 |

(Continued)

OTHER PUBLICATIONS

Chinese Office Action for Application No. 201480077652.3 dated Jul. 27, 2018 in 10 pages with English translation.

*Primary Examiner* — Scott R. Walshon
(74) *Attorney, Agent, or Firm* — Knobbe, Martens, Olson & Bear, LLP

(57) ABSTRACT

Disclosed is an adhesive tape for fastening including an adhesive layer on at least one surface of substrate, wherein the substrate has a surface roughness (Ra) of 20 μm or less, the adhesive tape has a breaking strength of 100 N to 200 N/25 mm in a longitudinal direction, an elongation at break of 10% or less, an edge tearing resistance of 120 to 200 N/20 mm, and is compliant with FMVSS 302, a weight does not fall in a test of holding power for cylindrical back surface of substrate, and the adhesive tape for fastening exerts excellent deployability, fastening properties and, also, fire resistance when used in airbag fastening applications. [Test of holding power for cylindrical back surface of substrate] An adhesive tape 1' is attached to the surface of a cylindrical jig 2 having a diameter of 28 mm, further an adhesive tape 1 that has been cut to a width of 10 mm is attached to the adhesive tape 1' (back surface) such that the adhesive tape 1 is attached over a distance of only 30 mm, the weight (a load of 500 g) is attached and left to stand still in a 95° C.

(Continued)

environment for 30 minutes, and a check is performed to determine whether or not the weight has fallen due to separation of the adhesive tape 1.

4 Claims, 1 Drawing Sheet

(51) Int. Cl.
    *C09J 7/25*         (2018.01)
    *C09J 133/08*     (2006.01)
    *C09J 175/04*     (2006.01)
    *C08G 18/62*     (2006.01)
    *C08G 18/80*     (2006.01)
    *B60R 11/00*     (2006.01)

(52) U.S. Cl.
    CPC ........... *C09J 133/00* (2013.01); *C09J 133/08* (2013.01); *C09J 175/04* (2013.01); *B60R 2011/0063* (2013.01); *C09J 2201/622* (2013.01); *C09J 2400/263* (2013.01); *C09J 2433/00* (2013.01); *C09J 2477/006* (2013.01)

(56) References Cited

FOREIGN PATENT DOCUMENTS

| EP | 0976857 B1 | 4/2003 |
| EP | 2218819 A1 | 8/2010 |
| JP | 2004-315651 A | 11/2004 |
| JP | 2008-239758 A | 10/2008 |
| JP | 4355161 B | 8/2009 |

\* cited by examiner

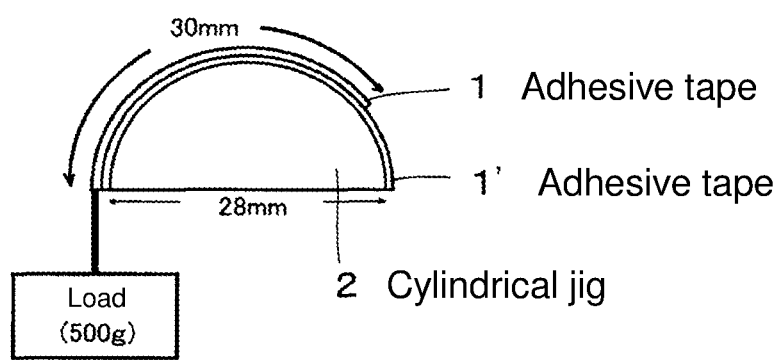

ADHESIVE TAPE FOR FASTENING

CROSS-REFERENCE TO RELATED APPLICATIONS

This application is the U.S. National Phase under 35 U.S.C. § 371 of International Application PCT/JP2014/059522, filed Mar. 31, 2014. The disclosures of the above-described applications are hereby incorporated by reference in their entirety.

TECHNICAL FIELD

The present invention relates to an adhesive tape for fastening having physical properties suitable for airbag fastening applications and, more specifically, relates to an adhesive tape for fastening exerting excellent airbag deployability, fastening properties and, moreover, fire resistance.

BACKGROUND ART

Recently, automobiles that are equipped with airbags for saving the lives of occupants in automobile accidents are in widespread use. Moreover, as more advanced safety devices, side airbags and curtain airbags that cover nearly the entire side windows are installed in increasing numbers. These protect especially the heads of occupants during a side-impact vehicle crash. Such airbags are made from components obtained by impregnating specific woven fabric with a flexible resin. When installing such an airbag onto a vehicle body, an airbag is folded in a pleated manner, fastened with a fastener such as a thread or an adhesive tape, and placed such that the fastener breaks when the airbag goes off, so the airbag is instantly deployed.

As for the woven fabric that constitutes an airbag, fire-resistant woven fabric is normally used. This is to prevent a fire resulting from a high temperature inflation gas produced when deploying the airbag as well as the spread of vehicle fire. However, fire resistance was not a requirement of airbag fasteners. This was because the amount of fastener was extremely small relative to the entirety of a vehicle and to an airbag unit. However, as a result of an increased number of airbags installed per vehicle as airbags become widespread and automakers' increasing awareness of fire-resistant vehicle components, such a high level of fire resistance that, for example, FMVSS, 302 is satisfied is also required of airbag fasteners (e.g., adhesive tapes).

As an example of a method for imparting fire resistance to an adhesive tape, there is a method in which a flame retardant is added. However, such a method results in poor fastening properties, and accordingly a fastening tape may be separated during the period of handling from fastening of an airbag to installation onto a vehicle body or after equipping an automobile with an airbag.

To date, as an airbag fastener, an adhesive tape has been mainly used in which woven fabric obtained by plain-weaving acetate yarn, polyester yarn, acryl yarn, cotton yarn, or the like is used as a substrate. It has been believed more desirable to have a narrow adhesive tape width, or perform perforation processing on an adhesive tape if the adhesive tape has a large width, such that the adhesive tape instantly breaks when the airbag is deployed (see Patent Literature 1). However, when the adhesive tape has a narrow width, the substrate may unravel. Moreover, the perforation processing on the adhesive tape results in increased costs, which is age net cost reduction i.e., the priority of the auto industry.

In addition, in an adhesive tape that includes a woven fabric substrate, when an adhesive layer is thin or does not receive sufficient pressure during attachment, there is a possibility that the adhesive does not fill the irregularities of the back surface of the substrate, and the adhesive tape is separated. On the other hand, increasing the thickness of the adhesive layer to prevent separation increases material costs and requires a worker to perform a process of pressure bonding again on attached portions once an airbag is fastened, thereby resulting in increased costs.

CITATION LIST

Patent Literature

Patent Literature 1: JP4355161B

SUMMARY OF INVENTION

Technical Problem

As described above, concerning an adhesive tape for fastening used for airbags or the like, an adhesive tape, the fastening properties of which are not problematic even when an adhesive layer is thin, and the substrate of which has a back surface with reduced irregularities, is desired for more reduced costs. Furthermore, it is also desired that the tape even without, perforation processing instantly breaks when an airbag is deployed.

That is to say, an object of the present invention is to provide an adhesive tape for fastening that exerts excellent deployability, fastening properties and, moreover fire resistance when used in airbag fastening applications.

Solution to Problem

A result of having conducted diligent research to achieve the above object, the inventors found an inexpensive adhesive tape for fastening which has fire resistance compliant with FMVSS 302, an edge of which when fastened can attain sufficient adhesive strength after an airbag that has been folded in a pleated manner is fastened, which does not break or separate during the period from airbag fastening to installation onto a vehicle body or after installation, and which can instantly break such that the airbag can uniformly and instantly be deployed when the airbag goes off, and accomplished the present invention.

That is to say, the present invention is an adhesive tape for fastening it eluding an adhesive layer on at least one surface of a substrate, wherein the substrate has a surface roughness (Ra) of 20 μm or less, the adhesive tape has a breaking strength of 100 N to 200 N/25 mm in a longitudinal direction, an elongation at break of 10% or less, an edge tearing resistance of 120 to 200 N/20 mm, and fire resistance compliant with FMVSS 302, and a weight does not fall when the following test of holding power or cylindrical back surface of substrate is performed in a 95° C. environment for 30 minutes for the adhesive tape, wherein:

an adhesive tape 1' is attached to a surface including SUS of a cylindrical jig 2 having a diameter of 28 mm, further an adhesive tape 1 that has been out to a width of 10 mm is attached to the adhesive tape 1' (back surface) such that the adhesive tape 1 is attached over a distance of only 30 mm along a circumferential surface of the cylindrical jig 2 from a vertical plane on the circumferential surface as a starting point, the weight (a load of 500 g) is attached to an end of the starting point portion and left to stand still in a 95° C. environment for 30 minutes, and a check is performed determine whether or not the weight has fallen due to separation of the adhesive tape 1.

Advantageous Effect of Invention

The present invention can provide an adhesive tape for fastening that exerts excellent airbag deployability, fastening properties and, moreover, fire resistance when used in airbag fastening applications. Specifically the adhesive tape for fastening is a highly-workable, inexpensive adhesive tape for fastening which has fastening power for installing, for example, a side airbag or a curtain airbag which is a safety device for automobiles, onto an automobile body in a folded m can break when the airbag goes off, and, moreover, has fire resistance for suppressing the combustion of a tape portion when a high-temperature inflation gas is produced when the airbag deployed to be expanded or when fire occurs.

BRIEF DESCRIPTION OF DRAWING

FIG. 1 is a schematic diagram for explaining a test of holding power for cylindrical back surface of substrate.

DESCRIPTION OF EMBODIMENT

The adhesive tape of the present invention is an adhesive tape for fastening including an adhesive layer on at least one surface of a substrate.

The substrate used for the present invention is not particularly limited as long as it is a substrate that causes the adhesive tape to exert physical properties that will be described below. Specific examples of the substrate include fiber papers including fiber such as aramid fiber, polyester fiber, polypropylene fiber, acetate fiber, nylon fiber, vinylon fiber, cotton fiber, hemp fiber, pulp fiber, rayon fiber, and glass fiber. Among them, an aramid fiber paper is particularly preferable.

The basis weight of the substrate is preferably 34 to 75 g/m$^2$ and more preferably 40 to 65 g/m$^2$. The density of the substrate is preferably 0.5 to 1.5 g/cm$^3$ and more preferably 0.6 to 0.8 g/cm$^3$. The thickness of the substrate is preferably 0.025 to 0.10 mm and more preferably 0.05 to 0.09 mm. Fastening properties and workability are more enhanced with such a substrate.

The surface roughness (Ra) of the substrate is 20 μm less and is preferably 14 μm or less. As for the measurement of this roughness (Ra), a value is obtained in accordance with JIS B 0601 using a confocal optical system including pinholes of a laser microscope. With such a substrate, poor fastening properties resulting from insufficient pressure bonding can be prevented. Moreover, the thickness of the adhesive layer can be reduced, and a further pressure bonding process can be omitted, both of which lead to reduced costs.

The adhesive that is used for the present invention and constitutes the adhesive layer is not particularly limited as long as it is an adhesive that causes the adhesive tape to exert physical properties that will be described below. Specific examples include acryl-based adhesives, rubber-based adhesives, urethane-based adhesives, and silicon-based adhesives. Among them, acryl-based adhesives a referable, and acryl-based adhesives containing butyl (meth)acrylate as a main component are particularly preferable. The adhesive may contain various additives such as a crosslinking agent for crosslinking a main-component polymer, a resin for increasing tackiness, and a filler for enhancing cohesion. The thickness of the adhesive layer is preferably 30 to 100 μm from the viewpoint of airbag fastening property and cost.

The adhesive layer can be formed with such an adhesive on one surface or both surfaces of a substrate. It is also possible that, for example, an adhesive composition is applied to a substrate and heated or irradiated with UV to carry out a crosslinking reaction to form an adhesive layer on the substrate or, for example, an adhesive composition is applied to a lease sheet or another film and heated or irradiated with UV to carry out a crosslinking reaction to form an adhesive layer, and this adhesive layer is attached to one surface or both surfaces of a substrate.

A release sheet, if used, is not particularly limited as long as it has, good adhesion to the adhesive and can be easily separated from the adhesive layer during fastening work. Specific examples include release sheets obtained by applying a silicone-based or similar release agent to paper materials, such as wood-free paper, glassine paper, and craft paper, that are coated with a resin layer of polyethylene or the like.

The breaking strength in the longitudinal direction of the adhesive tape of the present invention is 100 N to 200 N/25 mm and preferably 100 to is 130 N/25 mm. The value of this breaking strength is measured under conditions of a 23° C., 50% environment in accordance with JIS Z 0237. With a breaking strength of less than 100 N/25 mm, the tape breaks during the work of airbag fastening process, thus resulting in poor workability. With a breaking strength of more than 200 N/25 mm, there is a possibility that the tape does not break when the airbag is deployed.

The elongation at break of the adhesive tape of the present invention is 10% or less. The value of this elongation at break is measured under conditions of a 23° C., 50% environment in accordance with JIS Z 0237. With an elongation at break of more than 10%, the elongation of the tape suppresses the expansion of the airbag when the airbag is deployed, thus making it difficult for the airbag to be promptly and uniformly deployed. Setting the elongation at break at 10% or less, a perforation process that is performed on conventional adhesive tapes for airbag fastening can be omitted.

The edge tearing resistance of the adhesive tape of the present invention is 120 to 200 N/20 mm and preferably 120 to 160 N120 mm. The value of this edge tearing resistance is measured under conditions of a 23° C., 50% environment in accordance with JIS C 2151 (Method B). With an edge, tearing resistance of less than 120 N/20 mm, there is a tendency that when a twisting force is applied to an airbag unit during the transportation of an airbag or installation onto an automobile, a portion of the tape is overloaded, and the tape breaks, thus impairing work efficiency and yield.

The adhesive tape having the above physical properties can be obtained, for example, with a substrate that has such physical properties.

The adhesive tape of the present invention has fire resistance compliant with FMVSS 302, Such an adhesive tape can be obtained, for example, with a fire-resistant substrate.

With the adhesive tape of the present invention, a weight does not fall when the test of holding power for cylindrical back surface of substrate is performed on the adhesive tape for 30 minutes in a 95° C. environment. According to the inventors' findings, this test of holding power for cylindrical back surface of substrate is a highly suitable test for evaluating the mode of separation that occurs slowly due to the difference between the stress of an actually fastened airbag and the stress of an adhesive tape and for evaluating tackiness over time, and serves as an excellent indicator of airbag fastening properties.

EXAMPLES

Below, the present invention will now be described in more detail by way of Examples and Comparative Examples. "PARTS" in the following description means parts by mass.

Example 1

An isocyanate-based crosslinking agent (manufactured by Nippon Polyurethane Industry Co., Ltd., trade name Coronate L) in an amount of 1.1 parts was added to 100 parts of, an acryl-based adhesive (manufactured by Toyochem Co., Ltd., trade name BPS6080TFK) and mixed to give an adhesive composition A. This adhesive composition A was applied to a release sheet (a craft paper, one polyethylene-laminated surface of which had been, coated with a silicone-based release agent) with a roll coater and dried at 100° C. for 2 minutes to form an adhesive layer having a thickness of 50 μm. An aramid fiber paper (manufactured by DuPont Teijin Advanced Papers Limited, trade name NOMEX, a basis weight of 50 g/m$^2$, a density of 0.6 g/cm$^3$, and a thickness of 0.090 mm) was attached as a substrate to this adhesive layer to give an adhesive tape for fastening.

Example 2

An adhesive tape for fastening was produced under the same conditions as Example 1 except that an aramid fiber paper (manufactured by DuPont Teijin Advanced Papers Limited, trade name NOMEX, a basis weight of 40 g/m$^2$, a density of 0.72 g/cm$^3$, and a thickness of 0.052 mm) was used as a substrate.

Comparative Example 1

An adhesive composition B was prepared under the same conditions as Example 1 except that the isocyanate-based crosslinking agent manufactured by Nippon Polyurethane Industry Co., Ltd., trade name Coronate L) was added in an amount of 0.6 parts by mass. An adhesive tape for fastening was produced under the sa conditions a Example 1 except that this adhesive composition B was used.

Comparative Example 2

An adhesive tape for fastening was produced under the same conditions as Example 1 except that an aramid fiber paper (a basis weight of 175 g/m$^2$, a density of 0.94 g/cm$^3$, and a thickness of 0.20 mm) was used as a substrate.

Comparative Example 3

An adhesive tape for fastening was produced under the same conditions as Example 1 except that a polyimide film (manufactured by Du Pont-Toray Co., Ltd., trade name PI Film Kapton 100H (0.025 mm), a basis weight of 35.5 g/m$^2$, a density of 1.42 g/cm$^3$, and a thickness of 0.025 mm) was used as a substrate.

Comparative Example 4

An adhesive tape for fastening was produced under the same conditions as Example 1 except that acetate woven fabric obtained by plain-weaving acetate yarn having a warp of 76 denier and a weft of 76 denier such that the longitudinal density was 137 threads/inch and the transverse density was 73 threads/inch was used as a substrate.

<Physical Property Tests>

The following tests were performed on the adhesive tapes of Examples and Comparative Examples.
(Surface Roughness of Substrate)

The surface roughness (μm) of the substrates was obtained in accordance with JIS B 0601 with a confocal optical system including pinholes of a laser microscope using super focal depth profilometer (manufactured by KEYENCE, VK8550).
(Thickness, Breaking Strength, and Elongation at Break of Adhesive Tapes)

The thickness (mm), the breaking strength (tensile strength) in the longitudinal direction (N/25 mm), and the elongation at break (%) of the adhesive tapes were measured in accordance with JIS Z 0237.
(Edge Tearing Resistance)

The edge tearing resistance (N/20 mm) of the adhesive tapes was measured in accordance with JIS C 2151 (Method B).
(Holding Power for Cylindrical Back Surface)

As shown in FIG. 1, the adhesive tape 1' was attached to the surface including SUS of the cylindrical jig 2 having a diameter of 28 mm, further an adhesive tape 1 that had been cut to a width of 10 mm was attached to the adhesive tape 1' (back surface) such that the adhesive tape 1 was attached over a distance of only 30 mm along the circumferential surface of the cylindrical jig 2 from the vertical plane on the circumferential surface as a starting point, a weight (a load of 500 g) was attached to an end of the starting point portion and left to stand still in a 95° C. environment for 30 minutes, and a check was performed to determine whether or not the weight had fallen due to separation of the adhesive tape 1. In the case where the weight did not fall, the distance of shift (mm) of the adhesive tape 1 was measured.
(Separation Due to Constant Load on Back Surface)

An adhesive tape with 20 mm width×50 mm used as a specimen was attached to the back surface of the adhesive tape (back surface) fixed to a stainless-steel plate, and adhered by a 2 kg pressure roller. Thereafter, a load of 100 g was applied in a 23° C., 50% environment, and the length (mm) of the separated adhesive tape was measured after 1 hour.
(Holding Power)

In accordance with JIS Z 0237, an adhesive tape with 20 mm width×20 mm used as a specimen received a load of 500 g, the distance of shift (mm) of the adhesive tape after 1 hour in a 70° C. environment was measured, and a check was performed to determine whether or not the weight had fallen.
(Airbag Deployability)

Airbag deployability was evaluated in accordance with the following criteria.

"○": Breaking strength is 200 N/25 mm or less, and elongation at is break is 10% or less, "Δ": Breaking strength is 200 N/25 mm or less, but elongation at break is more than 10%, and thus the tape may be usable after post-processing or the like.

"x": Breaking strength is more then 200 N/25 mm.
(Airbag Fastening Properties)

Airbag fastening properties (tape break, edge separation) were evaluated in accordance with the following criteria.

"○": (Tape break) Edge tearing resistance is 120 N/20 mm or more. (Edge separation) The weight does not fall in any of the test of holding power for cylindrical back surface of substrate and the test of separation due to constant load on back surface.

"x": (Tape break) Edge tearing resistance is less than 120 N/20 mm. (Edge separation) The weight falls in the test of holding power for cylindrical back surface of substrate or the test of separation due to constant load on back surface.
(Fire Resistance)

The FMVSS 302 test was performed on the adhesive tapes, and evaluations were made in accordance with the following criteria.

"○": FMVSS 302 compliant
"x": Not FMVSS 302 compliant

Moreover, due to the acetate woven fabric substrate, Comparative Example 4 also had inferior fire resistance.

INDUSTRIAL APPLICABILITY

The adhesive tape for fastening of the present invention exerts excellent deployability, fastening properties and, moreover, fire resistance when used in airbag fastening applications, and is therefore extremely useful in applications for fastening airbags (such as side airbags and curtain airbags) of vehicles, e.g., automobiles.

TABLE 1

| | | Example | | Comparative Example | | | |
|---|---|---|---|---|---|---|---|
| | | 1 Aramid paper | 2 Aramid paper | 1 Aramid paper | 2 Aramid paper | 3 PI film | 4 Acetate woven fabric |
| Adhesive | | A | A | B | A | A | A |
| Substrate properties | Substrate thickness (mm) | 0.090 | 0.052 | 0.090 | 0.20 | 0.025 | 0.17 |
| | Base weight (g/m²) | 50 | 40 | 50 | 175 | 35.5 | 76d × 76d |
| | Density (g · cm³) | 0.64 | 0.72 | 0.64 | 0.94 | 1.42 | — |
| | Surface roughness (μm) | 13.0 | 13.3 | 13.0 | 16.1 | 1.3 | 65.7 |
| Adhesive tape properties | Tape thickness (mm) | 0.13 | 0.11 | 0.13 | 0.23 | 0.08 | 0.18 |
| | Breaking strength (N/25 mm) | 128 | 118 | 128 | 214 | 165 | 160 |
| | Elongation (%) | 8 | 8 | 8 | 8 | 60 | 22 |
| | Edge tearing resistance (N/20 mm) | 130 | 120 | 130 | 509 | 157 | 234 |
| | Holding power for cylindrical back surface of substrate (Shift distance mm) | 0.7 | 0.7 | Fell within 10 minutes | Fell within 30 minutes | 0.6 | Fell within 30 minutes |
| | Separation due to constant load on back surface (Separation distance mm) | 7 | 6 | 6 | 10 | 2 | Fell in 3 minutes |
| | Holding power (Shift distance mm) | 0.9 | 0.9 | Fell within 30 minutes | 0.6 | 0.7 | 0.3 |
| Summary | Airbag deployability | ○ | ○ | ○ | x | Δ | Δ |
| | Fastening properties  Tape break | ○ | ○ | ○ | ○ | ○ | ○ |
| | Edge separation | ○ | ○ | x | x | ○ | x |
| | Fire resistance (FMVSS302) | ○ | ○ | ○ | ○ | ○ | x |

As clear from the results provided in Table 1, Examples 1 and 2 have an excellent balance of physical properties and, consequently, had favorable results with respect to any of the airbag deployability, fastening properties, and fire resistance. In particular, the test of holding power such as holding power for cylindrical back surface of substrate and the test of separation due to constant load on back surface correspond to evaluating the mode of separation that occurs slowly due to the difference between the stress of an actually fastened airbag and the stress of an adhesive tape and evaluating tackiness over time, and serve as indicators of a level of airbag fastening properties.

On the other hand, Comparative Example 1 has insufficient holding power, such as insufficient holding power to a rounded surface, and thus has inferior airbag fastening properties Since Comparative Example 2 has insufficient holding power to a rounded surface and, moreover, excessive breaking strength and edge tearing resistance, the airbag deployability and the fastening properties are inferior. The elongation of Comparative Example 3 is excessive, and therefore the airbag deployability is inferior. Comparative Example 4 has excessive substrate surface roughness, thus shows insufficient holding power to a rounded surface, and is readily separated from the back surface due to a constant load, and therefore the airbag deployability is somewhat inferior and, also, the airbag fastening properties are inferior.

REFERENCE SIGNS LIST

1 Adhesive tape
2 Cylindrical jig

What is claimed is:
1. An adhesive tape for fastening comprising an adhesive layer on at least one surface of a substrate, wherein
the substrate comprises a fiber paper having a basis weight of 40 to 50 g/m², a density of 0.64 to 0.72 g/cm³, and a thickness of 0.052 to 0.090 mm and has a surface roughness (Ra) of 20 μm or less,
the adhesive tape has a breaking strength of 100 N to 200 N/25 mm in a longitudinal direction, an elongation at break of 10% or less, an edge tearing resistance of 120 to 200 N/20 mm, and has fire resistance compliant with FMVSS 302, and
a 500 g weight does not fall when the following test of holding power for cylindrical back surface of substrate is performed for the adhesive tape in a 95° C. environment for 30 minutes, wherein:
an adhesive tape 1' is attached to a surface comprising SUS of a cylindrical jig 2 having a diameter of 28 mm, further an adhesive tape 1 that has been cut to a width 10 mm is attached to a back surface of the adhesive tape 1' such that the adhesive tape 1 is attached over a distance of only 30 mm along a circumferential surface of the cylindrical jig 2 from a vertical plane on the circumferential surface as a starting point, the weight is attached to an end of the starting point portion and left to stand still in a 95° C. environment for 30 minutes, and a check is performed to determine whether or not the weight has fallen due to separation of the adhesive tape 1.

2. The adhesive tape for fastening according to claim 1, wherein the fiber paper is an aramid fiber paper.

3. The adhesive tape for fastening according to claim 2, which is for use in an airbag fastening application.

4. The adhesive tape for fastening according to claim 1, which is for use in an airbag fastening application.

* * * * *